United States Patent [19]

Plasencia et al.

[11] Patent Number: 4,592,250
[45] Date of Patent: Jun. 3, 1986

[54] HYDROMECHANICAL TRANSMISSION WITH SPLIT TORQUE AND REGENERATIVE TORQUE FLOW PATHS

[75] Inventors: David B. Plasencia, Northville; Stewart P. Maxwell, Ann Arbor, both of Mich.

[73] Assignee: Ford Motor Company, Dearborn, Mich.

[21] Appl. No.: 557,294

[22] PCT Filed: Oct. 11, 1983

[86] PCT No.: PCT/US83/01591

§ 371 Date: Oct. 11, 1983

§ 102(e) Date: Oct. 11, 1983

[87] PCT Pub. No.: WO85/01785

PCT Pub. Date: Apr. 25, 1985

[51] Int. Cl.$^4$ .................. F16H 47/08; F16H 3/74; F16H 57/10; F16D 33/00

[52] U.S. Cl. ................... 74/688; 74/752 E; 74/731; 74/760; 192/3.31; 192/105 BA

[58] Field of Search .............. 74/677, 688, 731, 732, 74/752 E, 760, 761; 192/3.31, 105 BA, 3.27, 3.32, 3.25, 48.6, 48.9, 48.92

[56] References Cited

U.S. PATENT DOCUMENTS

| | | | |
|---|---|---|---|
| 2,889,715 | 6/1959 | De Lorean | 74/688 |
| 2,932,220 | 4/1960 | Nash | 74/732 |
| 3,024,668 | 3/1962 | Kronogard et al. | 74/688 |
| 3,106,107 | 10/1963 | Hardy | 74/688 |
| 3,314,307 | 4/1967 | Egbert | 74/688 |
| 3,355,966 | 12/1967 | Boehm | 74/688 |
| 3,359,827 | 12/1967 | Chapman, Jr. et al. | 74/677 |
| 3,398,604 | 8/1968 | Hause | 74/688 |
| 3,772,939 | 11/1973 | Hause | 74/677 |
| 4,014,223 | 3/1977 | Pierce, Jr. | 74/688 |
| 4,037,691 | 7/1977 | Ivey | 192/3.31 |
| 4,049,094 | 9/1977 | Polomski et al. | 192/3.31 |
| 4,063,623 | 12/1977 | Ivey et al. | 192/3.31 |
| 4,083,440 | 4/1978 | Silberschlag | 192/3.31 |
| 4,117,918 | 10/1978 | Silberschlag | 192/103 B |
| 4,124,106 | 11/1978 | Clauss | 192/3.31 |
| 4,140,208 | 2/1979 | Clauss et al. | 192/3.31 |
| 4,140,210 | 2/1979 | Schulz | 192/103 B |
| 4,157,136 | 6/1979 | Salle | 192/103 B |
| 4,224,837 | 9/1980 | Crosswhite | 74/688 |
| 4,226,123 | 10/1980 | Crosswhite | 74/688 |
| 4,226,309 | 10/1980 | Silberschlag | 192/3.31 |
| 4,232,534 | 11/1980 | Lamarche | 192/106.2 X |
| 4,289,044 | 9/1981 | Dorpmund et al. | 74/688 |
| 4,304,107 | 12/1981 | Fall et al. | 192/106.1 X |
| 4,305,493 | 12/1981 | Silberschlag | 192/105 BA |
| 4,331,044 | 5/1982 | Bookout et al. | 74/688 |
| 4,383,596 | 5/1983 | Jackel | 192/3.31 |
| 4,398,436 | 8/1983 | Fisher | 74/688 |
| 4,413,536 | 11/1983 | Whitney et al. | 74/869 |
| 4,417,484 | 11/1983 | Gaus et al. | 74/688 |
| 4,454,786 | 6/1984 | Stockton | 74/688 |

FOREIGN PATENT DOCUMENTS 2406315 8/1975 Fed. Rep. of Germany ........ 74/688
2917448 11/1980 Fed. Rep. of Germany ..... 192/3.31

Primary Examiner—William F. Pate, III
Assistant Examiner—Stephen B. Andrews
Attorney, Agent, or Firm—Donald J. Harrington; Keith L. Zerschling

[57] ABSTRACT

A multiple speed ratio hydrokinetic transmission for a wheeled vehicle comprising a planetary gear set having two input torque flow paths and a hydrokinetic torque converter having an impeller element connected to one flow path and a turbine element connected to the other flow path; a friction lockup clutch which, under relatively high peed driving conditions, establishes a mechanical torque bypass path for engine torque in parallel with a torque flow path established by the hydrokinetic unit; and an overrunning coupling located between the friction clutch and the turbine element to adapt the transmission for a direct mechanical torque transfer from the vehicle engine to a driven member or a split torque path that is partly mechanical and partly hydrokinetic; provision being made during high speed ratio operation for a regenerative torque distribution between the input elements through the friction clutch and the overrunning coupling thereby providing improved driveline efficiency and improved driveability for the driveline with reduced harshness in ratio changes.

6 Claims, 19 Drawing Figures

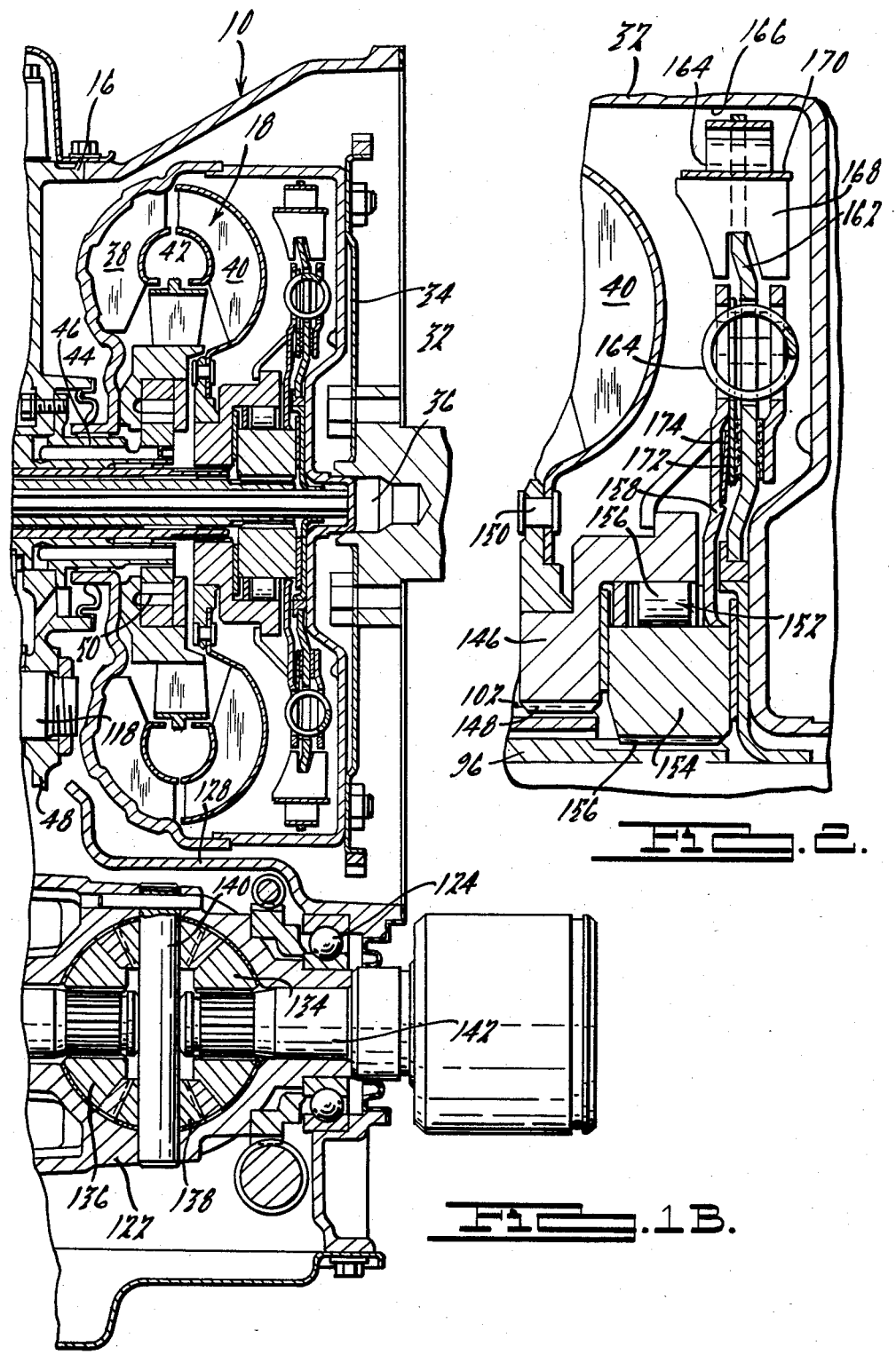

|  | $B_1$ | $CC_1$* | $Cl_1$ | $Cl_2$ | $Cl_3$ | $OWC_2$ | $OWC_1$ Drive | Coast |
|---|---|---|---|---|---|---|---|---|
| Park |  | X |  |  | X |  | N/A | N/A |
| Reverse |  | X |  |  | X |  | N/A | N/A |
| Neutral |  | X |  |  |  |  | N/A | N/A |
| D 1st | X | X |  |  |  | X |  |  |
| D 2nd | X | X | X |  |  | X |  |  |
| D 3rd |  | X | X | X |  |  |  |  |
| 2 1st | X | X |  |  |  | X |  |  |
| 2 2nd | X | X | X |  |  | X |  |  |
| 1 1st | X | X |  |  | X |  |  |  |
|  |  |  |  |  |  |  |  |  |

*$CC_1$ Centrifugal Clutch Comes On At Predetermined Speed ≈ 1000 RPM

| | $B_1$ | $CC_1$* | $Cl_1$ | $Cl_2$ | $Cl_3$ | $OWC_2$ | $OWC_1$ Drive | ~~Coast~~ |
|---|---|---|---|---|---|---|---|---|
| Park | | X | | | | | N/A | N/A |
| Reverse | | X | | | | | N/A | N/A |
| Neutral | | X | | | | | N/A | N/A |
| D 1st | X | X | | | | | | |
| D 2nd | | X | | X | | | | |
| D 3rd | | | | | | | | |
| 2 1st | | | | | | | | |
| 2 2nd | | | | | | | | |
| 1 1st | | | | | | | | |
| | | | | | | | | |

*$CC_1$ Centrifugal Clutch Comes On At Predetermined Speed ≈ 1000 RPM

|  | $B_1$ | $CC_1$* | $Cl_1$ | $Cl_2$ | $Cl_3$ | $OWC_2$ | $OWC_1$ Drive | ~~Coast~~ |
|---|---|---|---|---|---|---|---|---|
| Park |  | X |  |  |  | X | N/A | N/A |
| Reverse |  | X | X |  | X |  | N/A | N/A |
| Neutral |  | X |  |  |  |  | N/A | N/A |
| D 1st |  | X |  | X |  |  |  |  |
| D 2nd |  | X | X | X |  |  |  |  |
| D 3rd |  |  | X | X |  | X |  |  |
| 2 1st |  | X |  | X |  |  |  |  |
| 2 2nd |  | X | X | X |  |  |  |  |
| 1 1st | X | X |  | X |  | X |  |  |
|  |  |  |  |  |  |  |  |  |

*$CC_1$ Centrifugal Clutch Comes On At Predetermined Speed ≈ 1000 RPM

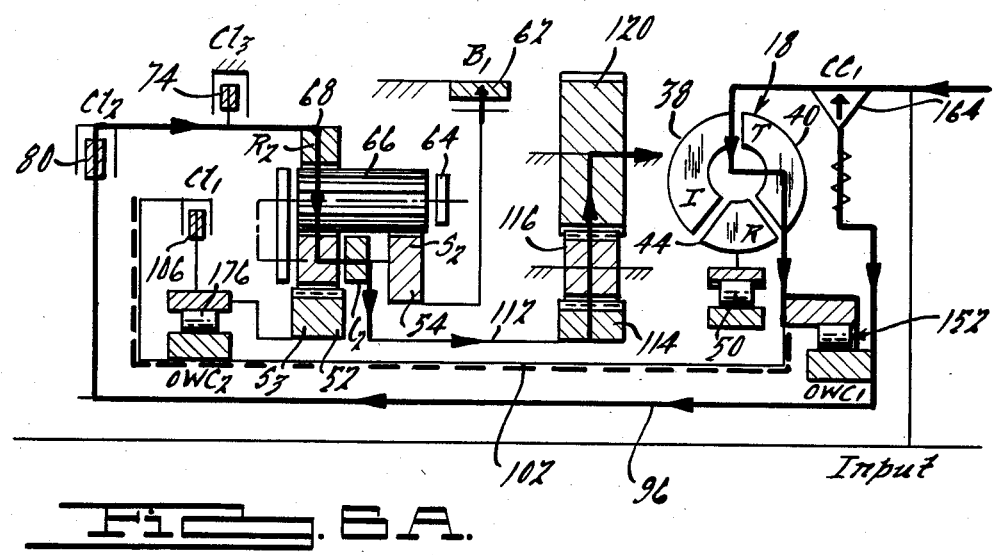

| | $B_1$ | $CC_1$* | $Cl_1$ | $Cl_2$ | $Cl_3$ | $OWC_2$ | $OWC_1$ Drive | ~~Coast~~ |
|---|---|---|---|---|---|---|---|---|
| Park | | X | | | | | N/A | N/A |
| Reverse | | X | X | | X | | N/A | N/A |
| Neutral | | X | | | | | N/A | N/A |
| D 1st | X | | | | | X | X | |
| D 2nd | X | X | | X | | | X | |
| D 3rd | | X | X | X | | | X | |
| 2 1st | X | | | | | X | X | |
| 2 2nd | X | X | | X | | | X | |
| 1 1st | X | | | | | X | X | |

*$CC_1$ Centrifugal Clutch Comes On At Predetermined Speed ≈ 1000 RPM

| | $B_1$ | $CC_1$* | $Cl_1$ | $Cl_2$ | $Cl_3$ | $OWC_2$ | $OWC_1$ Drive (X'd out) | Coast |
|---|---|---|---|---|---|---|---|---|
| Park | | | | | | | | |
| Reverse | | | | | | | | |
| Neutral | | | | | | | | |
| D 1st | | X | | | | | X | |
| D 2nd | | X | | X | | | X | |
| D 3rd | | X | X | X | | | X | |
| 2 1st | | X | | | | | X | |
| 2 2nd | | X | | X | | | | X |
| 1 1st | | X | | | | X | | X |
| | | | | | | | | |

*$CC_1$ Centrifugal Clutch Comes On At Predetermined Speed ≈ 1000 RPM

| | $B_1$ | $CC_1$* | $Cl_1$ | $Cl_2$ | $Cl_3$ | $OWC_2$ | $OWC_1$ Drive | ~~Coast~~ |
|---|---|---|---|---|---|---|---|---|
| Park | | × | × | × | × | × | N/A | N/A |
| Reverse | | × | | × | × | × | N/A | N/A |
| Neutral | | × | × | × | × | × | N/A | N/A |
| D 1st | × | | × | × | × | | | × |
| D 2nd | | | × | | × | × | | × |
| D 3rd | | | | | | × | | × |
| 2 1st | × | | × | × | × | | | × |
| 2 2nd | | | × | | × | × | | × |
| 1 1st | × | | × | × | × | | | × |
| | | | | | | | | |

*$CC_1$ Centrifugal Clutch Comes On At Predetermined Speed ≈ 1000 RPM

| | $B_1$ | $CC_1$* | $Cl_1$ | $Cl_2$ | $Cl_3$ | $OWC_2$ | $OWC_1$ Drive | Coast |
|---|---|---|---|---|---|---|---|---|
| Park | | | | | | | N/A | N/A |
| Reverse | | X | | | X | | N/A | N/A |
| Neutral | | | | | | | N/A | N/A |
| D 1st | | | | | | | | |
| D 2nd | | | | | | | | |
| D 3rd | | | | | | | | |
| 2 1st | | | | | | | | |
| 2 2nd | | | | | | | | |
| 1 1st | | | | | | | | |
| | | | | | | | | |

\* $CC_1$ Centrifugal Clutch Comes On At Predetermined Speed ≈ 1000 RPM

HYDROMECHANICAL TRANSMISSION WITH SPLIT TORQUE AND REGENERATIVE TORQUE FLOW PATHS

TECHNICAL FIELD

Our invention relates to multiple ratio, automatic power transmission mechanisms for automotive vehicles.

BACKGROUND ART

Our invention comprises improvements in a transaxle transmission of the kind disclosed in U.S. patent application Ser. No. 176,948, filed on Aug. 11, 1980, by David A. Whitney and Steven Kavalhuha, now U.S. Pat. No. 4,413,536, which is assigned to the assignee of this invention. It is an improvement also in U.S. Pat. No. 4,014,223, issued to Stanley L. Pierce, which also is assigned to the assignee of this invention.

The gearing arrangement disclosed in the Whitney et al application and the Pierce patent employ a hydrokinetic torque converter and compound planetary gearing arranged on a common axis. Final drive gearing located between the hydrokinetic torque converter and the compound planetary gearing distributes torque to an output axis that is arranged in parallel disposition with respect to the input shaft axis. An output differential unit connects the output shaft of the gearing with transversely disposed axle halfshafts that are connected in turn to the vehicle traction wheels for a front wheel drive vehicle such as the Escort and Lynx vehicles manufactured in 1983 by Ford Motor Company. Those vehicles use a transaxle that includes a split torque gear unit situated between a hydrokinetic torque converter and planetary gearing so that the turbine of the hydrokinetic unit transfers only a portion of the driving torque during intermediate ratio and high speed ratio operation thus reducing the hydrokinetic power losses. The gearing is like the gearing system used in the transmission disclosed in the Whitney et al application and the Pierce patent.

DISCLOSURE OF THE INVENTION

Our invention includes a compound planetary gear system having two input shafts arranged for driving torque delivery. The input shafts are connected to a vehicle engine through a hydrokinetic torque converter. Provision is made in our present invention for disabling the torque converter by establishing mechanical input torque delivery through a centrifugally actuated lockup clutch located within the impeller housing. At a predetermined speed the lockup clutch bypasses the converter and creates a mechanical torque flow path from the impeller shell to one of the two input shafts for the gearing. Examples of friction clutches capable of being used in an environment of this type may be seen by referring to U.S. Pat. Nos. 4,305,493; 4,226,309; 4,157,136; 4,037,691; 4,049,094; 4,083,440; 4,117,918; 4,140,208; 4,124,106; 4,140,210 and 4,063,623, all of which are assigned to Borg-Warner Corporation of Chicago, Ill. Reference may be had to those Borg-Warner patents for the purpose of supplementing the description of the centrifugal clutch described in this specification.

The multiple ratio gearing is a compound planetary gear set of the kind disclosed in Pierce U.S. Pat. No. 4,014,223, previously mentioned. The elements of the gear set are controlled by pressure operated friction clutches and brakes to establish three forward driving ratios and a single reverse driving ratio. The hydrokinetic unit includes a turbine and an impeller. The impeller is connected to the vehicle engine and the turbine is connected to a first of two torque input shafts for the gearing.

A friction clutch of the kind disclosed in the previously mentioned Borg-Warner patents is located within the impeller shell. It comprises a rotating disc carrying friction shoes that are adapted to engage frictionally a friction surface formed on the impeller shell when the speed of the engine exceeds a predetermined amount—for example, 1000 RPM. The radial disc member of the friction clutch is connected to the second input element of the gearing.

An overrunning coupling is used to deliver torque from the clutch disc member to the impeller and to transfer feedback torque in the opposite direction during third speed ratio operation. During second speed ratio operation, it is capable of providing a torque flow path through the hydrokinetic unit in parallel relationship with respect to the mechanical torque flow path established by the friction clutch during the operating interval in which the friction clutch is slipping.

BRIEF DESCRIPTION OF THE FIGURES OF THE DRAWINGS

FIG. 1A and FIG. 1B show separate sections of a working embodiment of our invention. It is a longitudinal, cross-sectional view of the transmission assembly. The portion of the assembly shown in FIG. 1A is the planetary gear and the hydrokinetic portion is shown in FIG. 1B together with the differential gearing.

FIG. 2 is an enlarged cross-sectional view of the lockup portion of the hydrokinetic unit shown in the assembly view of FIG. 1B.

FIGS. 6A and 6B correspond respectively to FIGS. 3A and 3B. They show the second gear coast drive condition.

BEST MODE FOR CARRYING OUT THE INVENTION

Figure 1A:
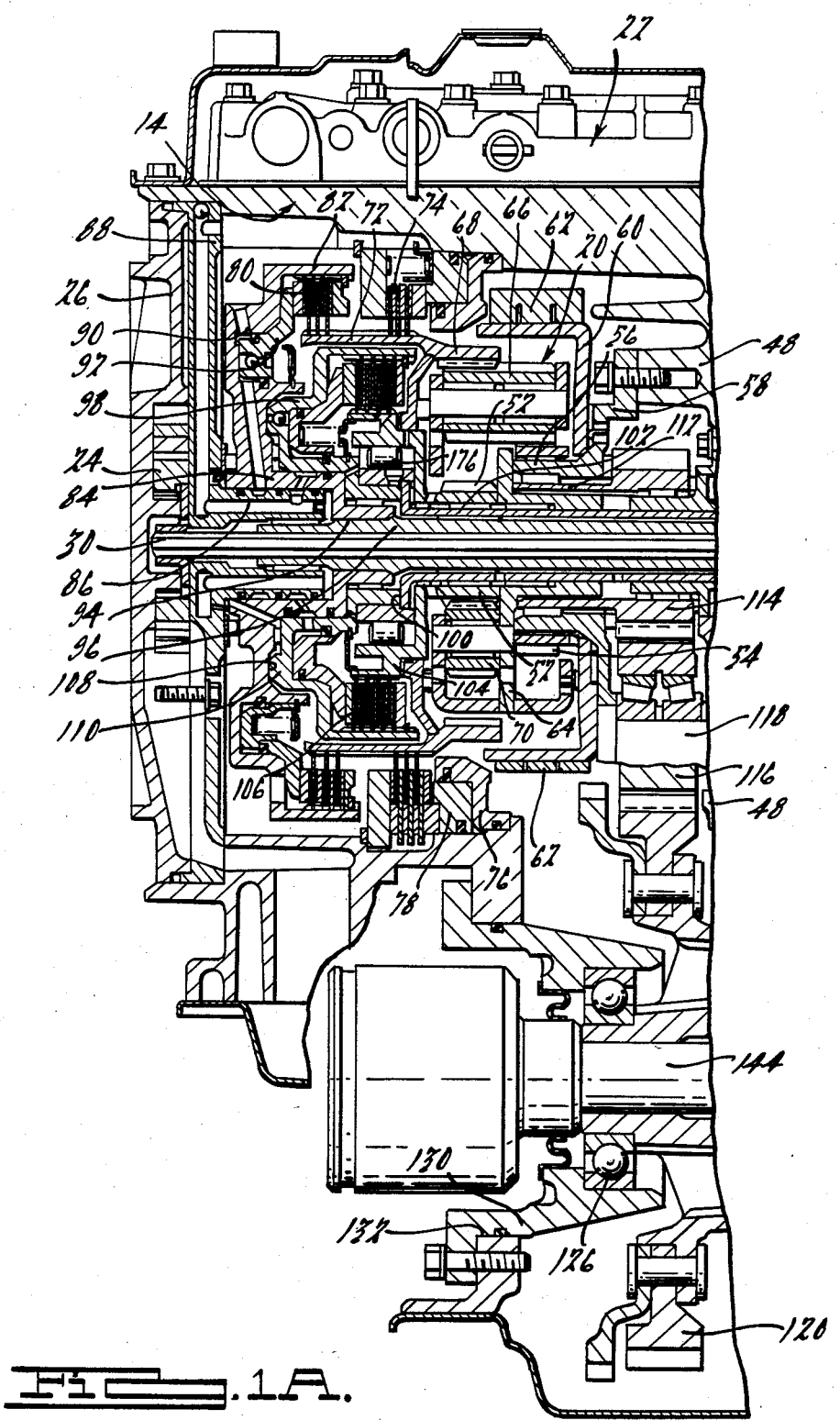

In FIG. B reference numeral 10 designates a portion of the transmission housing that is adapted to be bolted at its right hand margin 12 to the engine block of an internal combustion vehicle engine. In FIG. 1A reference numeral 14 generally designates the portion of the casing or housing for the planetary gear portion of the transmission mechanism. Housing portion 14 is adapted to be bolted at its right hand margin 16 to the transmission housing portion 10, the latter enclosing a hydrokinetic torque converter designated generally by reference character 18.

In FIG. 1A reference numeral 20 designates a compound planetary gear unit, and reference numeral 22 designates generally the valve body that contains the automatic control valves for controlling the actuation and release of the clutches and brakes associated with the gearing 20 to establish the various drive ratios. The source of pressure for the control valve system is a positive displacement pump 24 located in end plate 26 which is secured over end opening 28 at the left side of the housing portion 14. Pump 24 is driven by a drive shaft 30 which extends concentrically through the gearing and through the converter and which is splined or otherwise positively connected to an impeller shell 32 for the converter 18. Impeller shell 32 is connected by drive plate 34 to the crankshaft 36 of the internal combustion engine.

The converter 18 includes a bladed impeller 38 with impeller blades carried by the impeller shell 32. A bladed turbine 40 is in toroidal fluid flow relationship with respect to the impeller 38, and a bladed turbine 42 is situated between the flow exit section of the turbine 40 and the flow entrance section of the impeller 38. The hub 44 of the impeller 22 is supported by reactor sleeve shaft 46 formed on a wall 48 of the housing portion 14. Wall 48 separates the interior of the housing portion 10 from the interior of the housing portion 14. An overrunning brake 50 is located between the reactor hub 44 and the stationary sleeve shaft 46 so that reaction torque is delivered to the transmission casing during operation of the converter 18 in the torque multiplication mode. During coupling operation of the converter, the brake 50 freewheels in the direction of rotation of the impeller.

The gearing 20 comprises a small pitch diameter sun gear 52 and a large pitch diameter sun gear 54. Sun gear 54 is journalled on sun gear support sleeve 56, which forms a part of support plate 58 which in turn is secured to the wall 48. Sun gear 54 is connected to brake drum 60. Brake band 62 surrounds the drum 60 and is adapted to be applied and released by a fluid pressure operated servo, not shown.

A planetary carrier 64 rotatably supports a set of long planet pinions 66 which engage sun gear 54. Pinions 66 engage also ring gear 68. Carrier 64 rotatably journals also a set of short planet pinions 70. These engage small sun gear 52 as well as the long planet pinions 66. Ring gear 68 is connected to or forms a part of clutch-and-brake drum 72 which carries on its periphery brake discs 74. These discs register with brake discs carried by the housing portion 14.

A pressure cylinder for a brake servo is defined by cylinder ring 76 which is held fast on the housing portion 14 and which cooperates with the inner margin of the housing portion 14 to define a pressure chamber within which is received an annular piston 78. When the pressure chamber behind the piston 78 is pressurized, the ring gear 68 becomes braked by the brake discs.

Clutch discs 80 are carried by an externally splined part of the clutch-and-brake drum 72. These clutch discs cooperate with companion discs carried by clutch member 82. Clutch member 82 includes a hub 84 which is journalled on stationary sleeve shaft 86 formed on end wall 88 at the left hand side of the housing portion 14 adjacent the plate 26. Clutch member 82 includes an annular cylinder 90 in which is positioned an annular clutch cylinder 92 that is adapted to engage the discs 80 when the pressure chamber defined by the cylinder 90 and the piston 92 is pressurized.

Clutch member 82 is splined at 94 to clutch sleeve shaft 96 which is splined at its right hand end to the centrifugally operated clutch member for the centrifugally operated clutch that will be described with reference to FIG. 2.

Journalled on the hub 84 for the clutch member 82 is a second clutch member 98 connected by welding or some other attachment means 100 to sleeve shaft 102, which surrounds shaft 96. The right hand end of the shaft 102 is splined to the hub of the turbine as will be explained with reference to FIG. 2. Shaft 96 forms one torque input shaft for the gearing and shaft 102 forms a second torque input shaft for the gearing.

Clutch member 98 carries clutch discs that register with the clutch discs carried by clutch member 104. These discs form a multiple disc assembly identified by reference numeral 106.

Clutch member 98 defines an annular piston 108 in which is positioned an annular cylinder 110. When the working pressure chamber defined by the annular cylinder 108 and piston 110 is pressurized, piston 110 engages the multiple disc clutch assembly 106 thereby establishing a driving connection between clutch member 104 and clutch member 98. Clutch member 104 is connected directly to sun gear 52.

Carrier 64 is connected directly to sleeve shaft 112 which is connected to final drive input gear 114. Gear 114 meshes with a final drive idler 116 journalled on idler shaft 118 supported by the wall 48 of the casing. Idler 116 meshes with final drive output gear 120 carried by differential carrier 122, which in turn is supported by bearings 124 and 126. Bearing 124 is received within a bearing opening formed in an extension 128 of the housing portion 10 and bearing 126 is supported by a bearing support member 130 secured to an opening 132 in the housing portion 14.

Differential carrier 122 encloses a pair of differential side gears shown at 134 and 136, which in turn engage differential pinions 138. These pinions are supported on pinion shaft 140 carried by the carrier 122.

A first transaxle output shaft 142 is connected drivably to the side gear 134 and a second transaxle output shaft 144 is connected drivably to the side gear 136. The ends of these shafts 142 and 144 are connected respectively to inboard ends of separate axle halfshafts, not shown, which are drivably connected with a suitable U-joint connections with the vehicle traction wheels.

Turbine hub 146 is splined at 148 to input shaft 102. The hub 146 is riveted at 150 to turbine 40. Hub 146 forms an outer race for an overrunning coupling generally designated by reference character 152. The overrunning coupling includes an inner race 154, which is splined at 156 to input shaft 96. Overrunning clutch rollers 156 are situated between the inner and outer races and the overrunning coupling 152.

The inner race 154 is connected to damper disc 158, which is riveted or welded to a companion disc 160. A torque input damper disc 162 is located between the discs 158 and 160, and damper springs 164 are situated between the disc 162 and the paired discs 158 and 160.

For a particular description of a damper assembly of the kind shown in FIG. 2, reference may be made to U.S. Pat. Nos. 4,232,534 or 4,304,107, which are assigned to Borg-Warner Corporation of Chicago, Ill.

Disc 162 carries centrifugally operated friction brake shoes 164, which are adapted to engage the inner peripheral friction surface 166 of the impeller shell 32. The shoe assembly includes a plurality of centrifugal weights 168 separated from the shoes 164 by leaf springs 170, which yield radially to allow the shoes 164 to engage frictionally the surface 166 at a predetermined turbine speed thereby locking the turbine to the impeller. The engagement is cushioned by the damper assembly shown at 58, 160, 162 and 164.

In addition to the cushioning action of the springs 164 of the damper assembly, the damper assembly includes friction material 172 located between the discs 158 and 160, on the one hand, and disc 162 on the other hand. The friction material is urged into frictional engagement with the adjacent frictional surface by a Belleville spring 174 thereby providing friction damping.

Figures 3A, 3B:
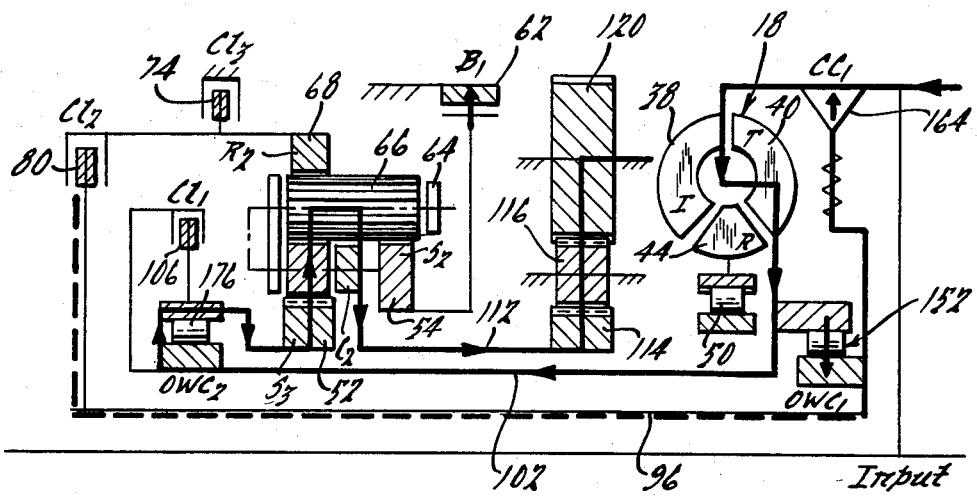
FIG. 3A is a schematic drawing of the principal elements of the cross-sectional view of FIGS. 1A and 1B.
FIG. 3B is a chart that shows the engagement and release pattern for the clutches and brakes during operation in the first forward driving gear ratio.

In FIG. 3A we have shown the torque flow diagram for the transmission mechanism described with reference to FIGS. 1 and 2 when the transmission is in condition for first gear drive operation. FIG. 3B shows the clutches and brakes that are applied and released to effect the first gear drive condition for each drive mode indicated in FIG. 3B. An "X" mark is used to identify the clutches and brakes that are active. A blank space indicates that the clutch or brake is inactive.

In FIG. 3A the symbol $OWC_1$ refers to the overrunning clutch assembly 152 shown in FIG. 2. The symbol $OWC_2$ in FIG. 3A refers to an overrunning coupling 176 in FIG. 1A which is located between clutch member 104 and the shaft 102.

Friction brake $B_1$ in FIG. 3A refers to brake 62 of FIG. 1A. Friction brake $CL_3$ in FIG. 3A refers to brake 74 of FIG. 1A. Clutch $CL_2$ in FIG. 3A refers to clutch 80 of FIG. 1A. Clutch $CL_1$ in FIG. 3A refers to clutch 106 of FIG. 1A.

To establish the first gear drive mode, brake $B_1$ is applied. Turbine torque then is transferred through shaft 102 and through overrunning clutch $OWC_2$ to the sun gear $S_3$, which corresponds to sun gear 52 of FIG. 1A. Carrier torque from carrier 64, with sun gear $S_2$ acting as a reaction point, transfers torque to the input gear element 114 of the final drive gearing.

Sun gear $S_2$ corresponds to sun gear 54 of FIG. 1A. After a predetermined impeller speed is reached, clutch $CC_1$, which corresponds to the centrifugal clutch of FIG. 2, becomes applied and torque then is transferred through it to shaft 102 thereby bypassing the converter.

Figures 4A, 4B:
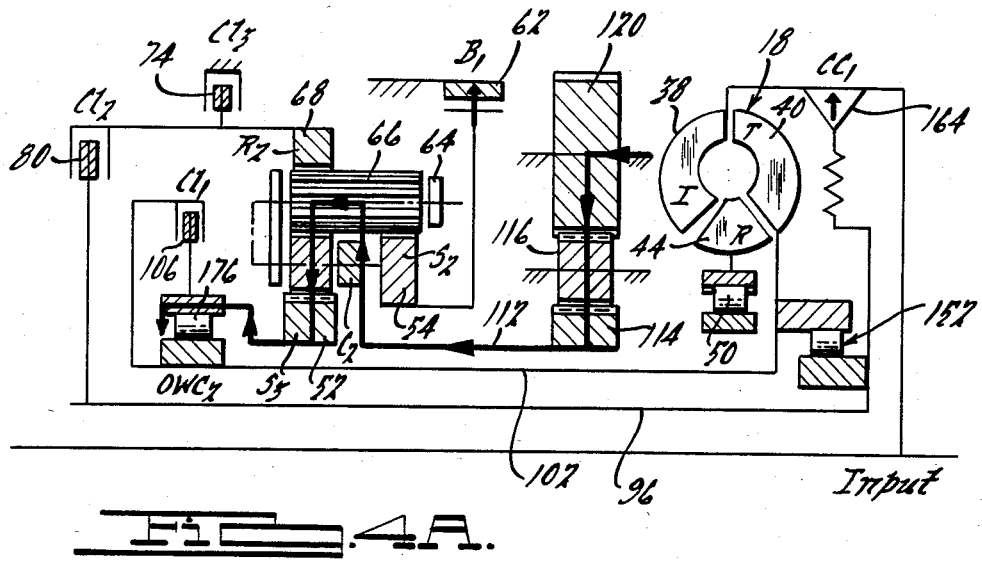
FIG. 4A is a drawing similar to FIG. 3A. It shows the torque flow path during operation in the first ratio under coast drive conditions.
FIG. 4B is a chart showing the engagement and release pattern of clutches and brakes during operation in the coast drive mode with the gearing ratio in the low speed underdrive condition.
Figures 5A, 5B:
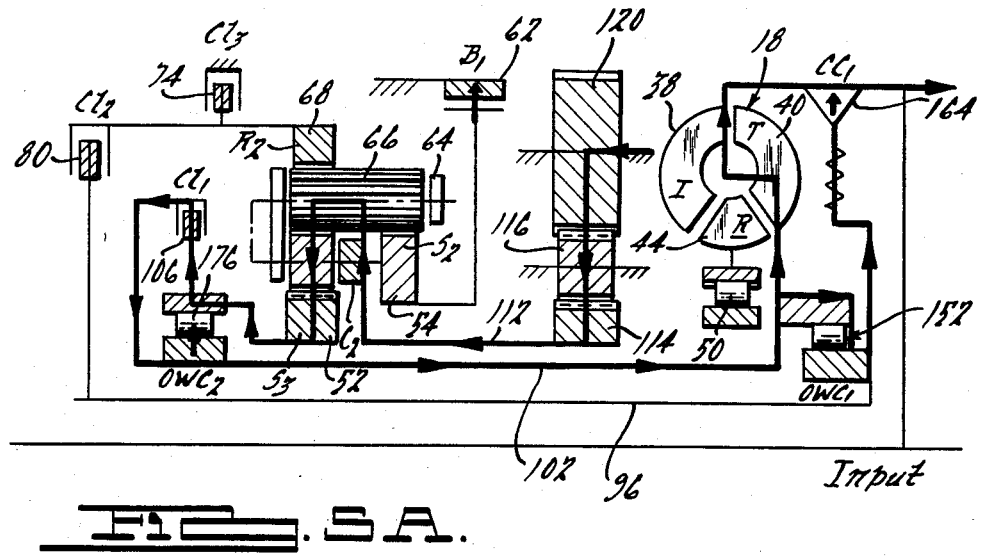
FIGS. 5A and 5B, which correspond respectively to FIGS. 3A and 3B, illustrate the operation of the transmission in the manual first gear coast drive condition.

FIGS. 4A and 4B are similar to FIGS. 3A and 3B, respectively, but they show the first gear coast condition rather than the first gear drive condition. Under coast conditions the final drive gearing delivers torque to the carrier of the planetary gear unit and coasting torque then is transferred to $OWC_2$, which freewheels thus effecting a generally freewheeling condition.

To effect the coast braking condition the manual first gear coast mode is available. Under that driving condition clutch $CL_1$ is applied thereby permitting torque to be delivered to the shaft 102 from the sun gear $S_3$. Hydrokinetic braking then takes place as the turbine overspeeds the impeller. If the coasting speed is high enough, clutch $CC_1$ comes on and coasting torque then can be transferred through the overrunning coupling $OWC_1$.

The second gear drive mode is achieved by engaging brake $B_1$ and clutch $CL_2$. Driving torque then is delivered from the turbine through the coupling $OWC_1$ and through the clutch $CL_2$ to the ring gear $R_2$, which corresponds to ring gear 68 of FIG. 1. With sun gear $S_2$ acting as a reaction member, torque is delivered from the carrier 64 to the final drive input gear 114. When clutch $CC_1$ becomes applied as the engine speed increases above a predetermined value such as 1000 rpm, a split torque delivery is achieved as part of the torque is delivered through the hydrokinetic unit and part is delivered through the clutch directly to the shaft 96.

Figures 7A, 7B:
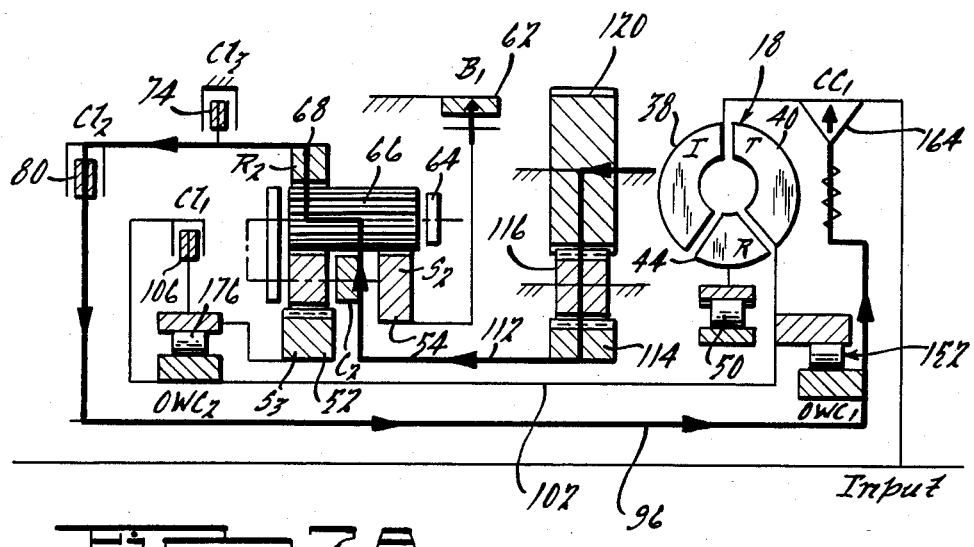
FIGS. 7A and 7B correspond respectively to FIGS. 3A and 3B. They show the second gear coast drive condition.

If coasting is desired in the second gear ratio, brake $B_1$ and clutch $CL_2$ remain applied as indicated in FIG. 7A. In the second gear coast condition shown in FIG. 7A, the clutches and brakes are engaged in accordance with the chart of FIG. 7B. Clutch $B_1$ and clutch $CL_2$ remain applied. With the brake $B_1$ serving as a reaction point the final drive gearing drives the carrier and coasting torque is delivered through the engaged clutch $CL_2$ to the shaft 96. If the clutch $CC_1$ is applied, second gear coast torque is transmitted to the engine.

Figures 8A, 8B:
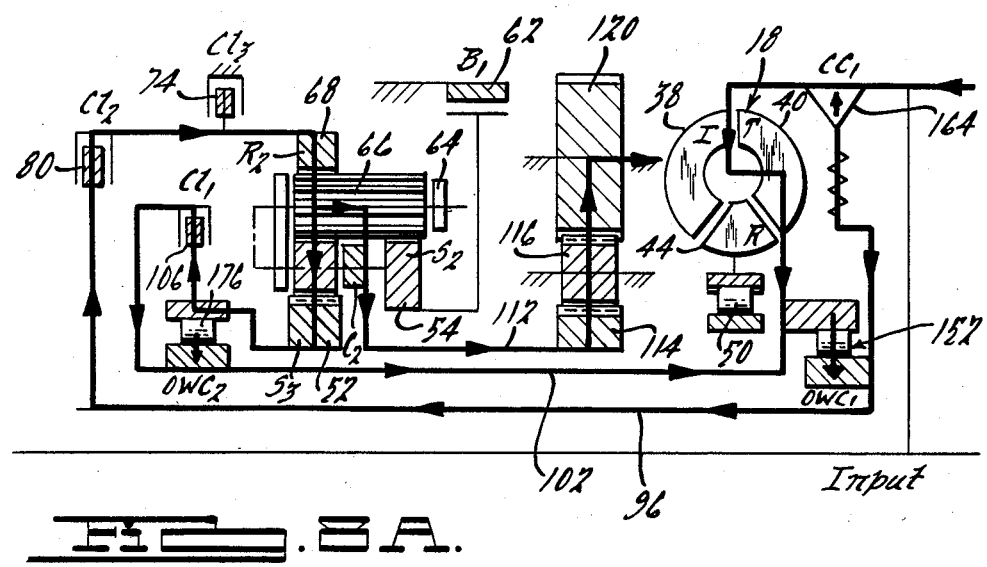
FIGS. 8A and 8B correspond respectively to FIGS. 3A and 3B. They show the third forward drive gear condition.

In the third gear drive mode shown in FIG. 8A a regenerative torque delivery path is established when the friction clutches and brakes are applied as indicated in FIG. 8B. At engine speeds lower than 1000 rpm turbine torque is transferred through the clutch $OWC_1$ and through the engaged clutch $CL_2$ to the ring gear $R_2$. The planetary gearing then splits the torque, a part of it going from the carrier to the input gear of the final drive gearing and the balance going through the clutch $OWC_2$ and through the engaged clutch $CL_1$ to the shaft 102. A regenerative torque flow path back to the input side of the mechanism thus is established to augment the carrier torque delivered to the final drive input gear 114.

Figures 9A, 9B:
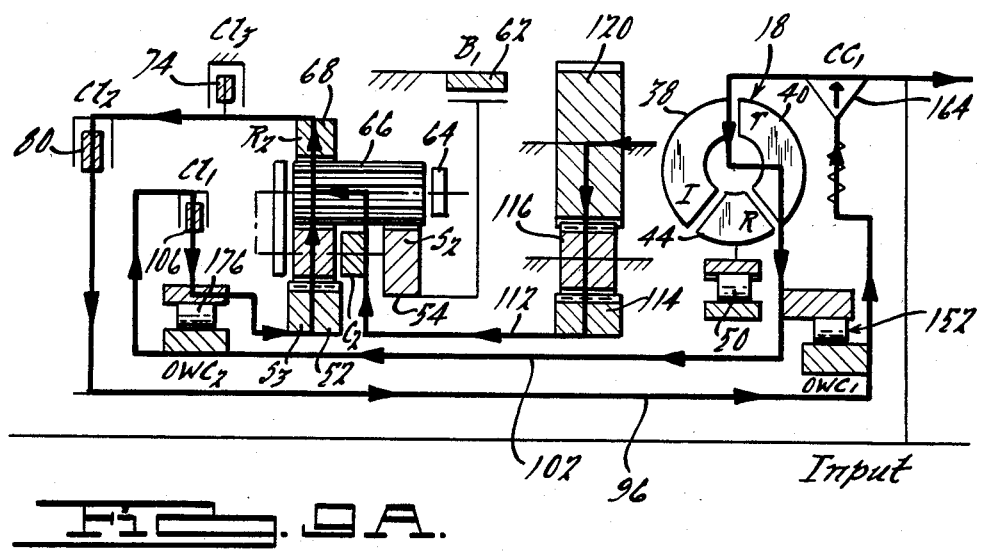
FIGS. 9A and 9B correspond respectively to FIGS. 3A and 3B. They show the third forward drive coast condition.

FIG. 9A shows a torque flow path during coasting in third gear with the clutch $CC_1$ applied. FIG. 9B shows the clutch and brake engagement and release pattern under third gear coast conditions. A regenerative torque flow path is established as the planetary gearing splits the coasting torque, a portion being delivered to the ring gear $R_2$ which drives the engine through the clutch $CC_1$ and the balance being delivered through the torque converter, through the shaft 102 and through the engaged clutch $CL_1$ to the sun gear $S_3$. This augments the ring gear torque delivered through the clutch $CC_1$.

Figures 10A, 10B:
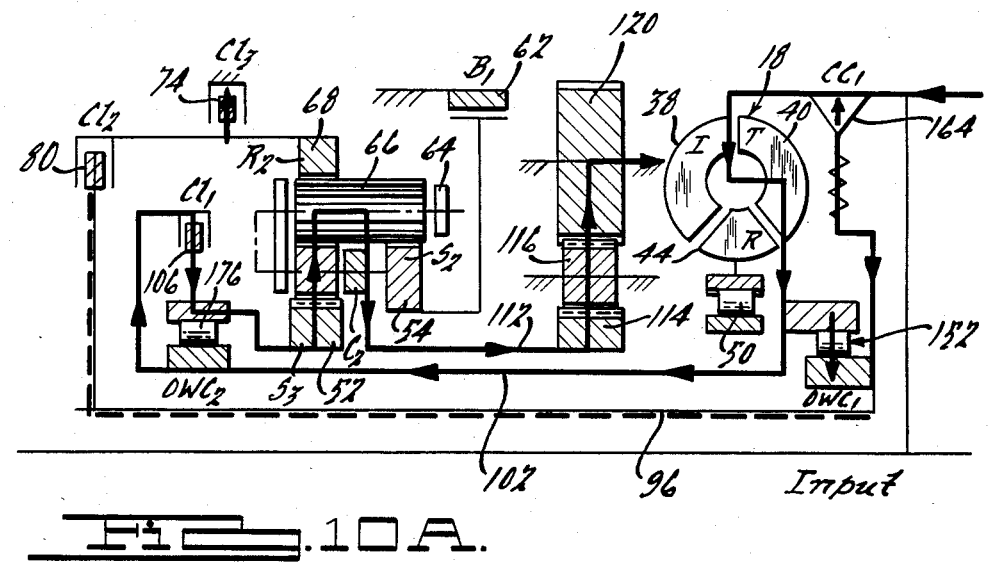
FIGS. 10A and 10B correspond respectively to FIGS. 3A and 3B. They show the reverse drive condition.

Reverse drive is achieved by engaging $CC_1$, $CL_1$ and $CL_3$ as shown in FIG. 10A. Turbine torque under these conditions is delivered to the shaft 102, which drives clutch $S_3$, the clutch $CL_1$ being engaged to establish a connection between shaft 102 and sun gear $S_3$. Output torque then is delivered from the carrier to the final drive input gear 114 as $CL_3$ acts as a reaction point. A split torque is provided at the input end after clutch $CC_1$ becomes applied so that part of the torque is delivered to the shaft 102 through the clutch $OWC_1$ and the balance is distributed hydrokinetically through the torque converter to the shaft 102.

We have provided, as described in the foregoing specification, a three speed automatic transmission with a hydromechanical drive in low ratio and reverse and a drive through a centrifugal clutch in second ratio and third ratio gear. An overrunning clutch $OWC_1$ provides a regenerative torque flow path in third ratio. During drive in second ratio the torque flow path is either 100 percent through the centrifugal clutch or is partly delivered through the torque converter and partly through the centrifugal clutch if the centrifugal clutch is allowed to slip, which is a condition that can be achieved with appropriate calibration of the centrifugal clutch. In the third ratio drive mode a regenerative torque condition is achieved as well as a split torque flow path, the latter depending upon the degree of slip that is allowed in the centrifugal clutch.

As a result of the unique mode of cooperation between the converter, the regenerative gearing and the split torque relationship between the overrunning coupling and the converter elements, the operating efficiency of the transmission is enhanced while achieving a high degree of performance. When the transmission is used in a vehicle driveline and compared to a vehicle driveline with an equivalent engine displacement with known transaxle systems, it efficiency and performance are superior.

Industrial Applicability

Our invention is adapted to be used in drivelines for wheeled vehicles having an internal combustion engine, especially multiple ratio driveline having a hydrokinetic unit with a blocked impeller connected to the engine.

We claim:

1. A hydrokinetic torque converter mechanism for an automotive vehicle driveline adapted to deliver driving torque from a driving shaft to an output shaft;
   a compound planetary gear unit having two input elements, a reaction element, separate torque input shafts connected respectively to said input elements;
   said hydrokinetic unit comprising a bladed impeller and a bladed turbine, the impeller being connected to said driving shaft, said turbine being connected to one of said input shafts;
   a centrifugally operated clutch means for connecting a second input shaft to said driving shaft and an overrunning coupling between the output side of said centrifugally actuated clutch and said first input shaft.

2. The combination as set forth in claim 1 wherein:
   said compound planetary gear unit comprises a ring gear, first and second sun gears, a carrier, a first set of pinions carried by said carrier in meshing engagement with the first sun gear and said ring gear, a second set of pinions engaged with said second sun gear and with said first set of pinions;
   first clutch means for connecting selectively said first input shaft to said second sun gear, second clutch means for selectively connecting said second input shaft to said ring gear;
   and first and second brake means for anchoring respectively the first sun gear and said ring gear to effect a second gear drive mode and reverse drive mode respectively.

3. The combination as set forth in claim 2 wherein said first clutch means for connecting said first input shaft to said second sun gear includes a selectively engageable friction clutch and an overrunning coupling arranged in parallel relationship, said friction clutch effecting coasting torque delivery therethrough and said overrunning coupling effecting torque delivery from said driving shaft to said sun gear during first gear drive.

4. The combination as set forth in claim 1 wherein said transmission comprising final drive gearing situated between said hydrokinetic unit and said compound planetary gear unit, said final drive gearing comprising a final drive input gear connected to said output shaft and a final drive output gear adapted to be connected to vehicle traction wheels.

5. The combination as set forth in claim 2 wherein said transmission comprising final drive gearing situated between said hydrokinetic unit and said compound planetary gear unit, said final drive gearing comprising a final drive input gear connected to said output shaft and a final drive output gear adapted to be connected to vehicle traction wheels.

6. The combination as set forth in claim 3 wherein said transmission comprising final drive gearing situated between said hydrokinetic unit and said compound planetary gear unit, said final drive gearing comprising a final drive input gear connected to said output shaft and a final drive output gear adapted to be connected to vehicle traction wheels.

* * * * *